(12) United States Patent
Li et al.

(10) Patent No.: US 10,412,632 B2
(45) Date of Patent: Sep. 10, 2019

(54) ADAPTIVE NUMEROLOGY FOR URLLC

(71) Applicant: QUALCOMM Incorporated, San Diego, CA (US)

(72) Inventors: Chong Li, Weehawken, NJ (US); Jing Jiang, San Diego, CA (US); Wanshi Chen, San Diego, CA (US); Hao Xu, San Diego, CA (US); Chih-Ping Li, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 15/410,215

(22) Filed: Jan. 19, 2017

(65) Prior Publication Data

US 2018/0049064 A1    Feb. 15, 2018

Related U.S. Application Data

(60) Provisional application No. 62/374,221, filed on Aug. 12, 2016.

(51) Int. Cl.
| | |
|---|---|
| *H04W 28/10* | (2009.01) |
| *H04L 5/00* | (2006.01) |
| *H04L 27/26* | (2006.01) |
| *H04W 24/02* | (2009.01) |
| *H04W 28/02* | (2009.01) |
| *H04W 72/04* | (2009.01) |
| *H04W 28/08* | (2009.01) |

(52) U.S. Cl.
CPC .......... *H04W 28/10* (2013.01); *H04L 5/0092* (2013.01); *H04L 27/2646* (2013.01); *H04W 24/02* (2013.01); *H04W 28/0289* (2013.01); *H04W 28/08* (2013.01); *H04W 72/04* (2013.01)

(58) Field of Classification Search
None
See application file for complete search history.

(56) References Cited

U.S. PATENT DOCUMENTS

2015/0180622 A1    6/2015  Yoo et al.
2015/0334708 A1    11/2015 Lee et al.

FOREIGN PATENT DOCUMENTS

WO    WO-2016004634 A1    1/2016

OTHER PUBLICATIONS

International Search Report and Written Opinion—PCT/US2017/037269—ISA/EPO—dated Sep. 12, 2017.
(Continued)

*Primary Examiner* — Donald L Mills
(74) *Attorney, Agent, or Firm* — Norton Rose Fulbright LLP

(57) ABSTRACT

Dynamically adaptive numerologies for ultra-reliable low-latency communications (URLLC) are discussed in which a base station may determine performance characteristics for each user equipment (UE) that it serves, in addition to detecting any fluctuations in system loading at the base station. Based on this information, the base may be select for each of the served UEs an adapted numerology that provides an optimized set of configurations that assist the communications between the base station and each UE to meet the strict parameters for URLLC. Once selected, the base station signals the selected adapted numerology to the UEs either through broadcast or UE-specific communications.

29 Claims, 5 Drawing Sheets

(56) References Cited

OTHER PUBLICATIONS

Panasonic: "Discussion on the Multiplexing of Different Numerologies", 3GPP TSG-RAN WG1 Meeting 85, R1-164985, May 13, 2016, XP051096781, Retrieved from the Internet: URL:http://www.3gpp.org/ftp/tsg_ran/WG1_RL1/TSGR1_85/Docs/, 5 pages.

ADAPTIVE NUMEROLOGY FOR URLLC

CROSS-REFERENCE TO RELATED APPLICATIONS

This application claims the benefit of U.S. Provisional Patent Application No. 62/374,221, entitled, "ADAPTIVE NUMEROLOGY FOR URLLC," filed on Aug. 12, 2016, which is expressly incorporated by reference herein in its entirety.

BACKGROUND

Field

Aspects of the present disclosure relate generally to wireless communication systems, and more particularly, to adaptive numerology for ultra-reliable low-latency communications (URLLC).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UNITS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes determining, by a base station, performance characteristics for each user equipment (UE) served by the base station, detecting a fluctuation in system loading at the base station, selecting, by the base station, an adapted numerology from a plurality of candidate numerologies for each UE, wherein the adapted numerology for each UE is selected based at least in part on one or both of: the performance characteristics associated with each UE, and the fluctuation in system loading, and signaling the adapted numerology to each UE served by the base station.

In an additional aspect of the disclosure, an apparatus configured for wireless communication, includes means for determining, by a base station, performance characteristics for each UE served by the base station, means for detecting a fluctuation in system loading at the base station, means for selecting, by the base station, an adapted numerology from a plurality of candidate numerologies for each UE, wherein the adapted numerology for each UE is selected based at least in part on one or both of: the performance characteristics associated with each UE, and the fluctuation in system loading, and means for signaling the adapted numerology to each UE served by the base station.

In an additional aspect of the disclosure, a non-transitory computer-readable medium having program code recorded thereon. The program code further includes code to determine, by a base station, performance characteristics for each UE served by the base station, code to detect a fluctuation in system loading at the base station, code to select, by the base station, an adapted numerology from a plurality of candidate numerologies for each UE, wherein the adapted numerology for each UE is selected based at least in part on one or both of: the performance characteristics associated with each UE, and the fluctuation in system loading, and code to signal the adapted numerology to each UE served by the base station.

In an additional aspect of the disclosure, an apparatus configured for wireless communication is disclosed. The apparatus includes at least one processor, and a memory coupled to the processor. The processor is configured to determine, by a base station, performance characteristics for each UE served by the base station, to detect a fluctuation in system loading at the base station, to select, by the base station, an adapted numerology from a plurality of candidate numerologies for each UE, wherein the adapted numerology for each UE is selected based at least in part on one or both of: the performance characteristics associated with each UE, and the fluctuation in system loading, and to signal the adapted numerology to each UE served by the base station.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
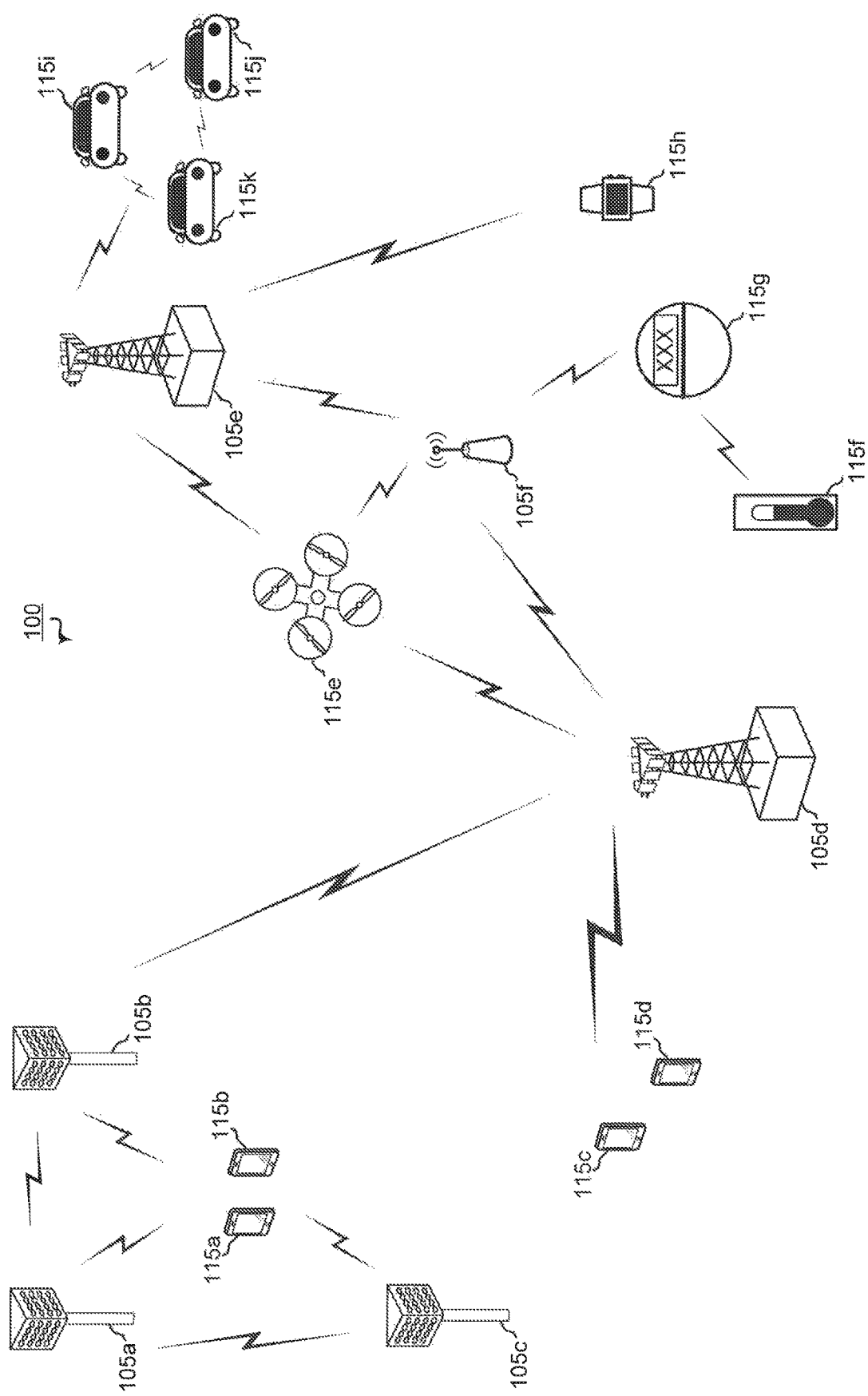
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 30 Hz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs allows transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at leak one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by Us with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like), A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations such that the frame timing and transmissions may be approximately aligned in time. For asynchronous operation, the base stations may have different frame timing and transmissions from different base stations such that the frame timing and transmissions may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115a-115d are examples of mobile smart phone-type devices accessing 5G network 100. A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
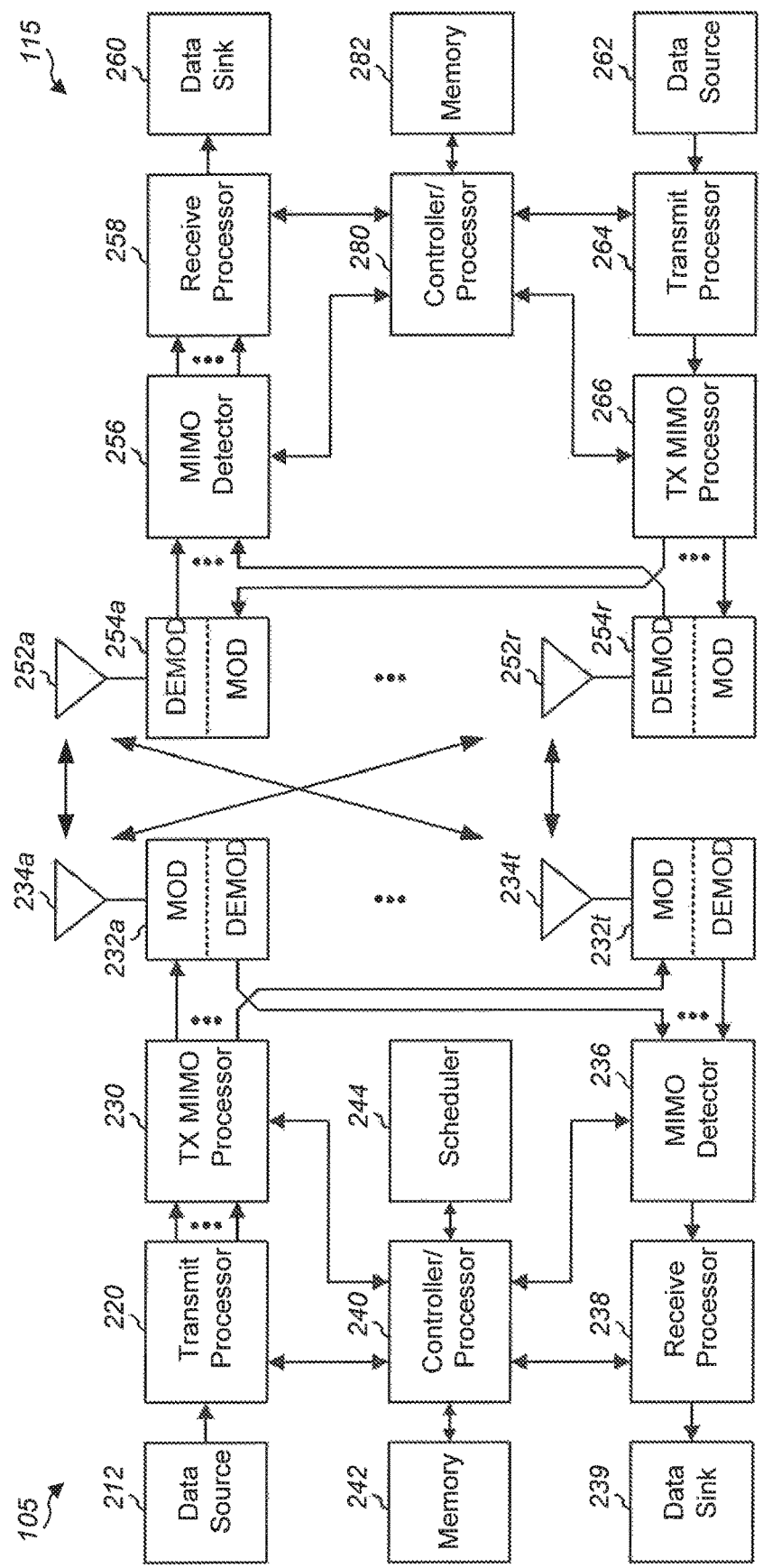
FIG. 2 is a block diagram conceptually illustrating a design of a base station/base station and a UE configured according to one aspect of the present disclosure.

FIG. 2 shows a block diagram of a design of a base station 105 and a UE 115, which may be one of the base stations and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUKED from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 3, and/or other processes for the techniques described herein. The memories 242 and 282 may store data and program codes for the base station 105 and the UE 115, respectively. A scheduler 244 may schedule UEs for data transmission on the downlink and/or uplink.

Multiple traffic types may co-exist in a 5G macro cell, e.g., enhanced mobile broadband (eMBB), ultra-reliability low-latency communication (URLLC). In order to meet standards for URLLC in 5G, a network would provide for a very high reliability (e.g., 10e-8) and low latency (e.g., 500 µs). In the LTE numerology, the transmission time interval (TTI) and round-trip time (RTT) are static and tied to channels, such as PDSCH unicast, eMBMS, RACH, etc. Due to dynamic system/channel conditions, static numerology may not be efficient for URLLC to achieve such stringent requirements. Various aspects of the present disclosure provide a UE-specific dynamic numerology mechanism for URLLC.

Figure 3:
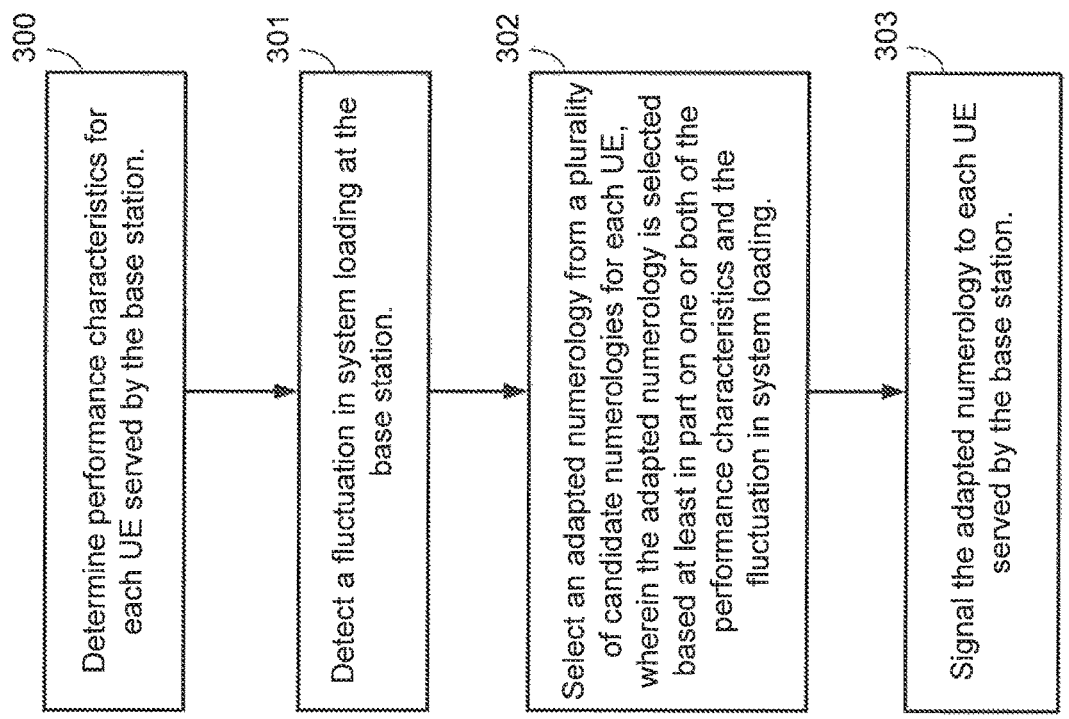
FIG. 3 is a block diagram illustrating example blocks executed to implement one aspect of the present disclosure.
Figure 5:
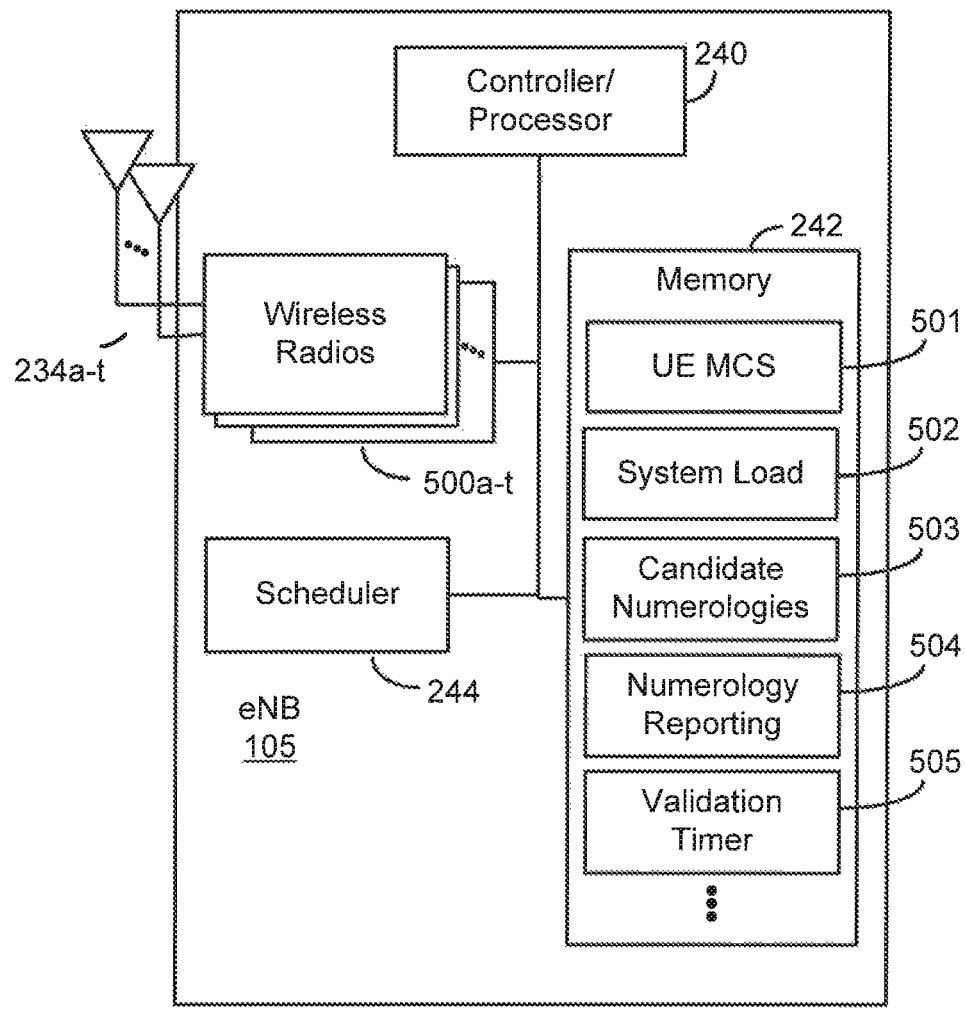
FIG. 5 is a block diagram illustrating a base station configured according to one aspect of the present disclosure.

FIG. 3 is a block diagram illustrating example blocks executed to implement one aspect of the present disclosure. The example blocks will also be described with respect to base station 105 as illustrated in FIG. 5. FIG. 5 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 500a-t and antennas 234a-t. Wireless radios 500a-t includes various components and hardware, as illustrated in FIG. 2 for base station 105, including modulator/demodulators 232a-t, MIMO detector 236, receive processor 238, transmit processor 220, and TX MIMO processor 230.

At block 300, a base station determines performance characteristics for each served by the base station. For example, in order to implement URLLC, a base station, such as base station 105 (FIG. 7), under control of controller/processor 240, accesses the list of UE MCS 501, stored in memory 240. The MCS for each of the UEs served by base station 105 is stored at UE MCS 501 and reflects the performance characteristics of that particular UE. Additional examples of performance related characteristics that may be determined or useful in the determination of the performance include delay spread, signal-to-noise ratio (SNR), block error rate (BLER), and the like.

At block 301, the base station detects a fluctuation in system loading. For example, base station 105 detects any changes to system loading by monitor the number of served UEs and the loading or demand for communication with the served UEs. System load 502, stored in memory 242, may include information related to the system load, including the number of served UEs, communication requests, and the like.

At block 302, the base station selects an adapted numerology from a plurality of candidate numerologies for each UE, wherein the adapted numerology for each UE is selected based at least in part on one or both of: the performance characteristics associated with each UE, and the fluctuation in system loading. For example, base station 105, under control of controller/processor 240 executes numerology selection logic 503, stored in memory 242, which considers various levels of UE performance and system load in determining which numerology should be associated with the particular UE in order to meet the reliability and latency criteria for URLLC. The execution environment of numerology selection logic 503 accesses a list of candidate numerologies 503, stored in memory 242 to select the determined adapted numerology for the specific UE. According to the described aspect, each UE served by base station 105 may be configured with a different numerology dynamically on a slot-by-slot or semi-static basis.

At block 303, the base station signals the adapted numerology to each UE served by the base station. For example, after selection of the adapted numerology through execution of numerology selection logic 503, base station 105, under control of controller/processor 240 will signal the selected adapted numerology to the served UE via wireless radios 500a-t and antennas 234a-t. The signaling of the adapted numerology may be included in a system information block (SIB), control channel, or both.

URLLC can apply dynamic numerology for each UE to fulfill the stringent reliability and latency factors. Numerology generally includes parameters such as tone spacing, cyclic prefix (CP) length, etc. A numerology can be dynamically adapted slot-by-slot or semi-statically. In select aspects, a certain validity duration for a new numerology for a URLLC UE may be considered and implemented using a timer, such as validation timer 505. Once the adapted numerology has been dynamically selected, controller/processor 240 will initiate validation timer 505. After expiration of validation timer 505, the numerology for each of the UEs will revert to the previous numerology. Base station 105 may signal the expiration of validation timer 505 or parallel validation timers may be maintained on each UE, which would trigger each UE to revert to the previous numerology upon expiration.

The numerology may be adapted based at least in part on a URLLC performance and processing timeline. For example, modulation and coding scheme (MCS), system load, latency, layers, delay-spread report, etc., may be considered for making determinations for a particular numerology. The numerology decision can be signaled via system information block (SIB) when considering a large time scale, a control channel PDCCH when considering a small time scale, or both.

Figure 4:
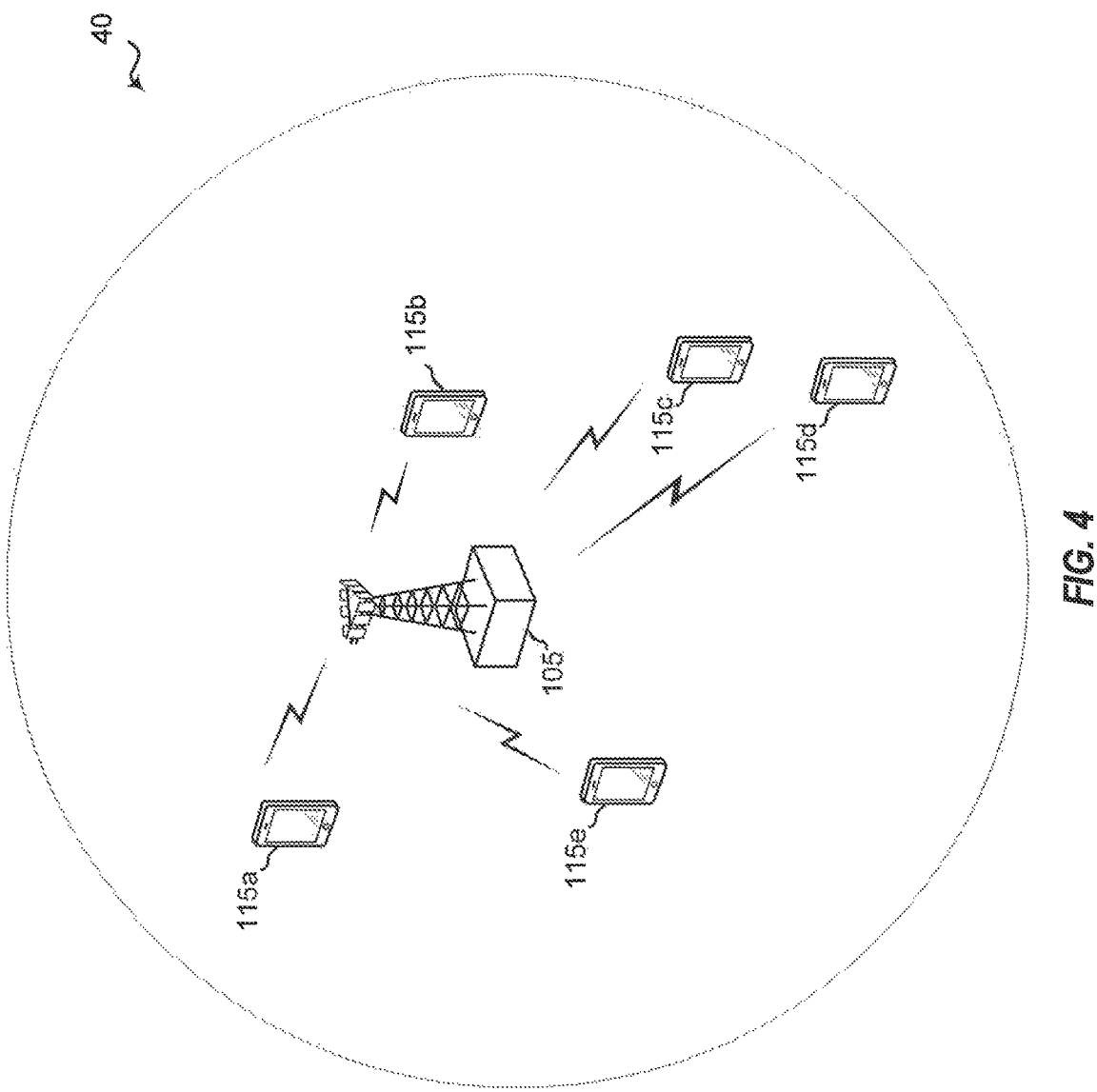
FIG. 4 is a block diagram illustrating a coverage area of a base station configured according to one aspect of the present disclosure.

FIG. 4 is a block diagram illustrating a coverage area 40 of a base station 105 configured according to one aspect of the present disclosure. URLLC is implemented by base station 105 in addition to dynamic adaptation of numerologies for maintaining URLLC reliability and latency factors. A given UE and base station may have different capabilities of numerologies For example, UE 115a may be capable of handling tone spacing of 15 kHz or 30 kHz, while base station 105 may be capable of handling 15 k, 30 k, and 60 kHz tone spacing. base station 105 would decide which one or ones of numerologies to be supported and broadcast that supported capability via SIB. If an adapted numerology may be applicable to control channels as well as data channels, a SIB would also carry the numerology decision for at least the control channels. If an adapted numerology is only applicable to data channels, the numerology decision may be signaled via either or both of SIB and/or PDCCH transmissions.

One aspect of the present disclosure provides for a performance-driven MCS-based numerology adaptation. In such an aspect, a base station, such as base station 105 identifies the MCS of each of its served UEs, such as UEs 115a-e. A low MCS UE may use a short symbol, characterized by large tone spacing, and a normal CP to achieve a short turn-around, High MCS UEs may use a long symbol, characterized by small tone spacing, and an extended CP to be robust against delay spread.

When UEs, such as UEs 115a-c are configured with different numerologies, their communications may be frequency division multiplexed by base station 105 with a guard band provided between the bands to ensure a limited inter-band interference. In various implementations of the presently described example aspect, UEs 115a-c, with different numerologies, may be configured to have the same TTI/RTT. Additional implementations may multiplex different TTIs with respect to different numerologies of LTEs 115a-c.

An additional aspect of the present disclosure provides for a processing-timeline-driven system-load-based numerology adaptation. A base station, such as base station 105, can adapt numerologies to a shorter symbol, and corresponding shorter TTI or RTT by increasing the tone spacing when system loading becomes higher. Larger tone spacing results in a shorter symbol which allows for faster HARQ turn-around. A faster HARQ turnaround is important in order for URLLC to achieve higher capacity, but at the expense of additional base station/UE processing complexity. Accordingly, larger tone spacing leads to capacity increase, which is beneficial when system-load is higher.

As illustrated in FIG. 4, base station 105 monitors the system load for its coverage area 40. As UEs 115d and 115e arrive in coverage area 40 to be served by base station 105 and other UEs, such as UEs 115b and 115c increase communication demands, base station 105 notes the increase in system load and is configured according the aspects of the present disclosure. That is, base station 105 may dynamically adapt numerologies for UEs 115a-e in order to continue to meet the reliability and latency parameters for URLLC. Different numerologies may be selected by base station 105 and configured for UEs 115a-115e depending on each individual UE's characteristics and operations.

The numerology may be adapted (at least partially) based on URLLC performance (e.g. MCS, delay spread) of UEs 115a-115e and processing timeline (e.g. latency, system load) monitored at base station 105. For performance-driven processing, all numerologies correspond to the same subframe/TTI duration and HARQ RTT to make the adaptation transparent to the TTI duration and roughly the same HARQ process timeline. Processing-time driven adaptation provides that TTI/RTT shall change along with the numerology change of UEs 115a-115e. By doing so, UEs 115a-115e can save power in processing/grant-monitoring.

Dynamic numerology decisions can be carried by SIB messages (large time scale), control channel messages (e.g., PDCCH) (short time scale), or both. For example, base station 105 transmits the information regarding the selected adapted numerology to any of UEs 115a-e, for which the adapted numerology has been selected. For carrier aggregation implementation, such as may be identified with UE 115b configured with carrier aggregation with base station 105, base station 105 may be capable of maintaining URLLC services by aligning the numerology across the component carriers configured for UE 115b. The alignment of numerologies may reduce interference, while allowing the same transport block to be mapped across carriers using the same numerology.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 3 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed, a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, by a base station, performance characteristics for each user equipment (UE) served by the base station, wherein the performance characteristics include a modulation and coding scheme (MCS) of each UE served by the base station;
   determining whether the MCS of the each UE is below a threshold;
   detecting a fluctuation in system loading at the base station;
   selecting, by the base station, an adapted numerology from a plurality of candidate numerologies for each UE, wherein the adapted numerology for each UE is selected based at least in part on the performance characteristics associated with each UE, wherein, in response to determining that the MCS is below the threshold, the selecting includes selecting the adapted numerology for the each UE to include a short symbol time, a large tone spacing, and a normal cyclic prefix; and
   signaling the adapted numerology to each UE served by the base station.

2. The method of claim 1, wherein the signaling includes one of:
broadcasting the adapted numerology in a system information block (SIB);
transmitting the adapted numerology in a control channel; or
a combination thereof.

3. The method of claim 2,
wherein, when both control channels and data channels support changing numerologies, the broadcasting the adapted numerology in the SIB is performed for at least the control channels; and
wherein, when only data channels support changing numerologies, one or both of the broadcasting and the transmitting are performed for the data channels.

4. The method of claim 1, further including:
initiating a validity timer for the adapted numerology in response to the signaling;
in response to expiration of the validity timer, signaling reinstatement of a previous numerology previously replaced by the adapted numerology.

5. The method of claim 4, wherein the validity timer is one of:
system wide; or
specific to each UE served by the base station.

6. The method of claim 1, wherein the selecting and the signaling the adapted numerology is performed one of:
for each slot; or
semi-statically based on the determining and the detecting.

7. The method of claim 1, further including:
in response to determining that the MCS is above the threshold, selecting the adapted numerology for the each UE to include a long symbol, a small tone spacing, and an extended cyclic prefix.

8. The method of claim 1, further including:
multiplexing communications by frequency for a first UE and a second UE of the each UE served by the base station, wherein the adapted numerology selected for the first UE is different from the adapted numerology selected for the second UE; and
inserting a guard band between the multiplexed communications for the first UE and the second UE.

9. The method of claim 1, further including one of:
assigning a transmission time interval (TTI) and roundtrip time (RTT) to the first UE and the second UE; or
multiplexing a plurality of different TTIs and a plurality of different RTTs for the first UE and the second UE.

10. The method of claim 1, wherein the selecting is further based on the fluctuation in system loading, and wherein the detecting the fluctuation in system loading includes:
detecting an increase in the system loading, wherein the adapted numerology selected includes a shorter symbol and a larger tone spacing.

11. The method of claim 1, wherein each of the plurality of candidate numerologies includes values for:
subcarrier spacing;
cyclic prefix length;
number of symbols per transmission time interval (TTI);
roundtrip time (RTT); or
combinations thereof.

12. An apparatus configured for wireless communication, comprising:
means for determining, by a base station, performance characteristics for each user equipment (UE) served by the base station, wherein the performance characteristics include a modulation and coding scheme (MCS) of each UE served by the base station;
means for determining whether the MCS of the each UE is below a threshold;
means for detecting a fluctuation in system loading at the base station;
means for selecting, by the base station, an adapted numerology from a plurality of candidate numerologies for each UE, wherein the adapted numerology for each UE is selected based at least in part on the performance characteristics associated with each UE, wherein, in response to a determination that the MCS is below the threshold, the means for selecting include means for selecting the adapted numerology for the each UE to include a short symbol time, a large tone spacing, and a normal cyclic prefix; and
means for signaling the adapted numerology to each UE served by the base station.

13. The apparatus of claim 12, wherein the means for signaling includes one of:
means for broadcasting the adapted numerology in a system information block (SIB);
means for transmitting the adapted numerology in a control channel; or
a combination thereof.

14. The apparatus of claim 12, further including:
means for initiating a validity timer for the adapted numerology in response to execution of the means for signaling;
means, executable in response to expiration of the validity timer, for signaling reinstatement of a previous numerology previously replaced by the adapted numerology.

15. The apparatus of claim 12, wherein the means for selecting and the means for signaling the adapted numerology is performed one of:
for each slot; or
semi-statically based on results of the means for determining and the means for detecting.

16. The apparatus of claim 12,
wherein, in response to determining that the MCS is not below the threshold, the means for selecting include means for selecting the adapted numerology for the each UE to include a long symbol, a small tone spacing, and an extended cyclic prefix.

17. A non-transitory computer-readable medium having program code recorded thereon, the program code comprising:
program code executable by a computer for causing the computer to determine, by a base station, performance characteristics for each user equipment (UE) served by the base station, wherein the performance characteristics include a modulation and coding scheme (MCS) of each UE served by the base station;
program code executable by a computer for causing the computer to determine whether the MCS of the each UE is below a threshold;
program code executable by the computer for causing the computer to detect a fluctuation in system loading at the base station;
program code executable by the computer for causing the computer to select, by the base station, an adapted numerology from a plurality of candidate numerologies for each UE, wherein the adapted numerology for each UE is selected based at least in part on the performance characteristics associated with each UE, wherein, in response to a determination that the MCS is below the threshold, the program code executable by the computer for causing the computer to select includes program code executable by the computer for causing the computer to select the adapted numerology for the each UE to include a short symbol time, a large tone spacing, and a normal cyclic prefix; and program code executable by the computer for causing the computer to signal the adapted numerology to each UE served by the base station.

18. The non-transitory computer-readable medium of claim 17, wherein the program code executable by the computer for causing the computer to signal includes one of:

program code executable by the computer for causing the computer to broadcast the adapted numerology in a system information block (SIB);

program code executable by the computer for causing the computer to transmit the adapted numerology in a control channel; or a combination thereof.

19. The non-transitory computer-readable medium of claim 17, further including:

program code executable by the computer for causing the computer to initiate a validity timer for the adapted numerology in response to execution of the program code executable by the computer for causing the computer to signal;

program code, executable by the computer in response to expiration of the validity timer, for causing the computer to signal reinstatement of a previous numerology previously replaced by the adapted numerology.

20. The non-transitory computer-readable medium of claim 17, wherein the program code executable by the computer for causing the computer to select and the program code executable by the computer for causing the computer to signal the adapted numerology is performed one of:

for each slot; or semi-statically based on results of the program code executable by the computer for causing the computer to determine and the program code executable by the computer for causing the computer to detect.

21. An apparatus configured for wireless communication, the apparatus comprising:

at least one processor; and a memory coupled to the at least one processor, wherein the at least one processor is configured:

to determine, by a base station, performance characteristics for each user equipment (UE) served by the base station, wherein the performance characteristics include a modulation and coding scheme (MCS) of each UE served by the base station;

to determine whether the MCS of the each UE is below a threshold;

to detect a fluctuation in system loading at the base station;

to select, by the base station, an adapted numerology from a plurality of candidate numerologies for each UE, wherein the adapted numerology for each UE is selected based at least in part on the performance characteristics associated with each UE, wherein, in response to a determination that the MCS is below the threshold, the configuration of the at least one processor to select includes configuration of the at least one processor to select the adapted numerology for the each UE to include a short symbol time, a large tone spacing, and a normal cyclic prefix; and to signal the adapted numerology to each UE served by the base station.

22. The apparatus of claim 21, wherein the configuration of the at least one processor to signal includes configuration of the at least one processor to one of:

broadcast the adapted numerology in a system information block (SIB);

transmit the adapted numerology in a control channel; or a combination thereof.

23. The apparatus of claim 22, wherein, when both control channels and data channels support changing numerologies, the configuration of the at least one processor to broadcast the adapted numerology in the SIB is performed for at least the control channels; and wherein, when only data channels support changing numerologies, one or both of the configuration of the at least one processor to broadcast and the configuration of the at least one processor to transmit are performed for the data channels.

24. The apparatus of claim 21, further including configuration of the at least one processor:

to initiate a validity timer for the adapted numerology in response to execution of the program code executable by the computer for causing the computer to signal;

to signal reinstatement of a previous numerology previously replaced by the adapted numerology, in response to expiration of the validity timer.

25. The apparatus of claim 21, wherein the configuration of the at least one processor to select and the configuration of the at least one processor to signal the adapted numerology is performed one of:

for each slot; or semi-statically based on results of the configuration of the at least one processor to determine and the configuration of the at least one processor to detect.

26. The apparatus of claim 21, wherein, in response to determining that the MCS is not below the threshold, the configuration of the at least one processor to select includes configuration of the at least one processor to select the adapted numerology for the each UE to include a long symbol, a small tone spacing, and an extended cyclic prefix.

27. The apparatus of claim 26, further including configuration of the at least one processor:

to multiplex communications by frequency for a first UE and a second UE of the each UE served by the base station, wherein the adapted numerology selected for the first UE is different from the adapted numerology selected for the second UE; and to insert a guard band between the multiplexed communications for the first UE and the second UE.

28. The apparatus of claim 26, further including configuration of the at least one processor to one of:

assign a transmission time interval (TTI) and roundtrip time (RTT) to the first UE and the second UE; or multiplex a plurality of different TTIs and a plurality of different RTTs for the first UE and the second UE.

29. The apparatus of claim 21, wherein the configuration of the at least one processor to detect the fluctuation in system loading includes configuration to detect an increase in the system loading, wherein the in the configuration of the at least one processor to select is further based on the fluctuation in system loading, and wherein the adapted numerology selected includes a shorter symbol and a larger tone spacing.

* * * * *